United States Patent
Ao

(10) Patent No.: US 10,474,239 B2
(45) Date of Patent: Nov. 12, 2019

(54) TOUCH SENSING DEVICE

(71) Applicant: HOSIDEN CORPORATION, Yao-shi, Osaka (JP)

(72) Inventor: Hitoshi Ao, Yao (JP)

(73) Assignee: HOSIDEN CORPORATION, Yao-Shi, Osaka (JP)

( * ) Notice: Subject to any disclaimer, the term of this patent is extended or adjusted under 35 U.S.C. 154(b) by 0 days.

(21) Appl. No.: 16/121,111

(22) Filed: Sep. 4, 2018

(65) Prior Publication Data

US 2019/0087005 A1    Mar. 21, 2019

(30) Foreign Application Priority Data

Sep. 15, 2017 (JP) ................. 2017-177337

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC . G06F 3/016; G06F 3/044; G06F 2203/04105
See application file for complete search history.

(56) References Cited

U.S. PATENT DOCUMENTS

2013/0321321 A1* 12/2013 Hiraoka .................. G06F 3/016
                                                                    345/173
2014/0306914 A1    10/2014   Kagayama

FOREIGN PATENT DOCUMENTS

| DE | 102015209590 A1 | 7/2016 |
| EP | 3070578 A1 | 9/2016 |
| JP | 2013008118 A | 1/2013 |
| WO | 2017017268 A1 | 2/2017 |

OTHER PUBLICATIONS

English translation of WO2017017268 (Year: 2017).*
Extended European Search Report for European Application No. EP 18191932.5, published by the European Patent Office (EPO), dated Feb. 11, 2019, including corresponding Communication, 1-page Annex, Information on Search Strategy, and 4-page EPO Form 1703.

* cited by examiner

*Primary Examiner* — Nelson M Rosario
(74) *Attorney, Agent, or Firm* — Kilyk & Bowersox, P.L.L.C.

(57) ABSTRACT

A touch sensing device including a vibratable plate, a touch sensor, a vibration generator including a plunger, an operation face, an opposed part opposed to the vibratable plate in a first direction, and a cushioning member. The plunger is configured to reciprocate in the first direction so as to vibrate the vibratable plate in the first direction. The operation face is to be touched by a detection object for inputting to operate the touch sensing device, and is vibratable as a result of vibration of the vibratable plate. The cushioning member is interposed between the opposed part and the vibratable plate in the first direction. The cushioning member is configured to reduce an amount of displacement in the first direction of the vibratable plate arising from the vibration in the first direction such that the amount is smaller than an amount of movement in the first direction of the plunger.

14 Claims, 3 Drawing Sheets

TOUCH SENSING DEVICE

CROSS-REFERENCE TO RELATED APPLICATION

The present application claims priority under 35 U.S.C. § 119 of Japanese Patent Application No. 2017-177337 filed on Sep. 15, 2017, the disclosure of which is expressly incorporated by reference herein in its entirety.

BACKGROUND OF THE INVENTION

Technical Field

The invention relates to touch sensing devices.

Background Art

A conventional touch sensing device is disclosed in Japanese Unexamined Patent Publication No. 2013-8118. The touch sensing device includes a touch sensor, a vibration generator, a cushioning member, and an upper housing. The vibration generator transmits vibration to the touch sensor when the touch sensor is touched so as to provide a sense of operation to the touch action. The cushioning member is interposed between the touch sensor and the upper housing, so that vibration transmitted to the touch sensor by the vibration generator will not be transmitted directly to the upper housing.

SUMMARY OF INVENTION

In the above conventional touch sensing device, it is not specified which direction the vibration generator transmits vibration to the touch sensor and how the touch sensor vibrates. In addition, there is no teaching or suggestion whether or how the cushioning member reduces vibration of an operation face of the touch sensor.

The invention is made in the above circumstances and provides a touch sensing device capable of reducing vibration of an operation face to be touched for giving input.

A touch sensing device of an aspect of the invention includes a vibratable plate, a touch sensor, a vibration generator, an operation face, an opposed part, and a cushioning member. The vibration generator includes a plunger, and the plunger is configured to reciprocate in a first direction so as to vibrate the vibratable plate in the first direction. The operation face is to be touched by a detection object for inputting to operate the touch sensing device. The operation face is vibratable as a result of vibration of the vibratable plate. The opposed part is in opposing relation to the vibratable plate in the first direction. The cushioning member is interposed between the opposed part and the vibratable plate in the first direction. The cushioning member is configured to reduce an amount of displacement in the first direction of the vibratable plate arising from the vibration in the first direction such that the amount is smaller than an amount of movement in the first direction of the plunger.

The touch sensing device of this aspect causes the amount of displacement of the vibratable plate in the first direction to be smaller than the amount of movement of the plunger of the vibration generator in the first direction with the cushioning member between the opposed part and the vibratable plate, so that vibration of the operation face can be reduced.

The vibratable plate may be omitted. In this case, it is preferable that the plunger of the vibration generator reciprocate in the first direction to transmit vibration in the first direction to the touch sensor, and that the operation face be vibratable as a result of the vibration of the touch sensor, not of the vibratable plate. It is also preferable that the opposed part be in opposing relation to the touch sensor in the first direction, and that the cushioning member be interposed between the opposed part and the touch sensor in the first direction, that the cushioning member be configured to reduce an amount of displacement in the first direction of the touch sensor arising from the vibration in the first direction such that the amount is smaller than an amount of movement in the first direction of the plunger.

The touch sensing device of this aspect causes the amount of displacement of the touch sensor in the first direction to be smaller than the amount of movement of the plunger of the vibration generator in the first direction with the cushioning member between the opposed part and the touch sensor, so that vibration of the operation face can be reduced.

The touch sensing device according to any of the above aspects may further include a control part. The control part may be configured to drive the vibration generator in response to a change in an output signal from the touch sensor. When a user gives input to the touch sensing device of this aspect by touching the operation face with a detection object, the vibratable plate or the touch sensor vibrates, and the operation face accordingly vibrates so as to transmit the vibration to the detection object.

The touch sensing device according to any of the above aspects may further include a load detector. The load detector may be configured to detect a load applied to the operation face when the operation face is touched by a detection object for inputting, and to output or change an output signal. In this case, the control part may be configured to drive the vibration generator in response to an input of the output signal form the load detector, or in response to a change in the output signal from the load detector. When a user gives input to the touch sensing device of this aspect by touching the operation face with a detection object to apply load on the operation face, the vibratable plate or the touch sensor vibrates, and the operation face accordingly vibrates so as to transmit the vibration to the detection object.

The touch sensing device according to any of the above aspects may further include a fixed plate including the opposed part. The load detector may be interposed between the fixed plate and the vibratable plate in the first direction, or between the fixed plate and the touch sensor in the first direction. The touch sensing device of this aspect causes a space between the fixed plate and the vibratable plate or between the fixed plate and the touch sensor to be effectively used as a placement space of the load detector, so that the touch sensing device can be reduced in size.

The control part may be configured as follows: (1) to determine whether the load applied to the operation face is equal to or larger than a first load on the basis of the input of the output signal from the load detector, or on the basis of the change in the output signal form the load detector; (2) when determining that the load is equal to or larger than the first load, to drive the vibration generator and determine whether the load applied to the operation face is equal to or less than a second load on the basis of the input of the output signal from the load detector, or the change in the output signal from the load detector, within a predetermined period, wherein the second load is smaller than the first load; and (3) when determining that the load is equal to or less than the second load, to drive the vibration generator. When a user gives input to the touch sensing device of this aspect by touching the operation face with a detection object to apply a larger load than the first load on the operation face, the vibratable plate or the touch sensor, and the operation face, vibrate so as to transmit the vibration to the detection object. Subsequently, when the detection object moves away from the operation face within the predetermined period such that the load applied to the operation face becomes equal to or less than the second load, the vibratable plate or the touch sensor, and the operation face, vibrate so as to transmit the vibration to the detection object. In other words, the vibration is transmitted to the detection object even when the detection object moves away from the operation face.

BRIEF DESCRIPTION OF DRAWINGS

The present invention can be even more fully understood with the reference to the accompanying drawings which are intended to illustrate, not limit, the present invention.

DESCRIPTION OF EMBODIMENTS

Various embodiments of the invention will now be described.

First Embodiment

Figure 1:
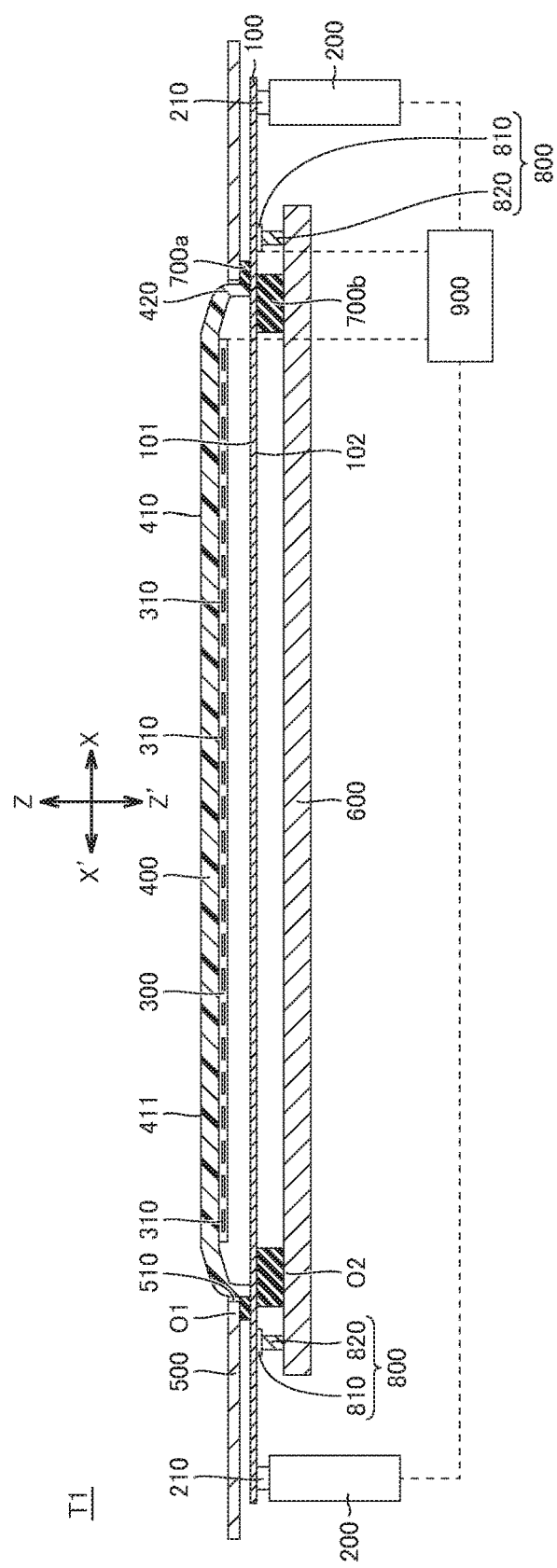
FIG. 1 is a schematic sectional view of a touch sensing device according to a first embodiment of the invention.

The following describes a touch sensing device T1 according to a plurality of embodiments including a first embodiment of the invention, with reference to FIG. 1. FIG. 1 shows the touch sensing device T1 of the first embodiment. As shown in FIG. 1, the Z-Z' direction is a vibration direction and a displacement direction of a vibratable plate 100 of the touch sensing device T1. The Z-Z' direction corresponds to the first direction in the claims, in which Z direction is one side of the first direction, and Z' direction is the other side of the first direction. As shown in FIG. 1, the X-X' direction is substantially orthogonal to the Z-Z' direction and corresponds to the second direction in the claims.

The touch sensing device T1 includes the vibratable plate 100 and at least one vibration generator 200. The vibratable plate 100, a metal plate or the like, has a first face 101 on the Z-direction side and a second face 102 on the Z'-direction side.

The or each vibration generator 200 is an electromagnetic solenoid and includes a plunger 210 and a coil (not shown). The or each vibration generator 200 may be disposed on the Z'-direction side as shown in FIG. 1, or on the Z-direction side, relative to the vibratable plate 100. The plunger 210 is configured to reciprocate in the Z-Z' direction as the coil is excited, and to repeatedly press the vibratable plate 100 in the Z-Z' direction so as to vibrate the vibratable plate 100 in the Z-Z' direction. The vibratable plate 100 is configured to, when vibrating in the Z-Z' direction, be repeatedly displaced in the Z-Z' direction.

As used herein an "amount of displacement" in the Z-Z' direction of the vibratable plate 100 arising from the vibration means a distance in the Z-Z' direction from the position where the vibratable plate 100 is displaced furthest in the Z direction to the position where the vibratable plate 100 is displaced furthest in the Z' direction. Also, an "amount of movement" in the Z-Z' direction of the plunger 210 of the or each vibration generator 200 means a distance of movement in the Z-Z' direction from a neutral position of the plunger 210 to a position where the plunger 210 is moved to the maximum degree.

A plurality of the vibration generators 200 may be provided and may be arranged as shown in FIG. 1. The plurality of vibration generators 200 may preferably be spaced apart from each other.

The touch sensing device T1 further includes a capacitive touch sensor 300 and an operation panel 400. The operation panel 400 may be made of a plastic material, such as polymethyl methacrylate (PMMA) or polycarbonate (PC). Alternatively, the operation panel 400 is made of one or more plastic plates and/or one or more plastic films. Each plastic plate or film is made of polycarbonate (PC), polystyrene (PS), cycloolefin copolymer (COC), cycloolefin polymer (COP), polymethyl methacrylate (PMMA), polypropylene (PP), or the like material, or a polymer alloy in which at least two of these materials are blended together.

The operation panel 400 includes a panel body 410 and a leg 420. The panel body 410 is a plate having an operation face 411. The operation face 411, an outer face of the panel body 410 on the Z-direction side, is to be touched by a user with a detection object, such as a finger or a stylus, for giving input to the touch sensing device T1. The operation face 411 may be flat or at least partly curved. The panel body 410 may further have a fixed face, which is an inner face of the panel body 410 on the Z' direction side. The leg 420 is a tube extending in the Z' direction from the periphery of the panel body 410. As shown in FIG. 1, the leg 420 of the operation panel 400 is fixed to the first face 101 of the vibratable plate 100 with screws, a double-sided adhesive material, or other means. The operation panel 400, fixed to the vibratable plate 100 as described above, is configured to vibrate in the Z-Z' direction as the vibratable plate 100 vibrates. As the operation panel 400 vibrates, its operation face 411 accordingly vibrates in the Z-Z' direction and in turn transmits the vibration to a user having or holding a detection object, i.e. provides the user with a tactile feeling (sense of operation). The leg 420 may be omitted. In this case, the panel body 410 may preferably be fixed to the first face 101 of the vibratable plate 100 with screws, a double-sided adhesive material, or other means.

The touch sensor 300 is positioned on the Z' direction side of the operation face 411 of the operation panel 400. The touch sensor 300 may be fixed to the fixed face of the operation panel 400 (see FIG. 1), or may be disposed inside the operation panel 400. In the latter case, the touch sensor 300 may be held between plastic plates or films of the operation panel 400, or may be insert molded in the operation panel 400. In any of these cases, the touch sensor 300 is fixed indirectly to the vibratable plate 100 via the operation panel 400, so that the touch sensor 300 vibrates in the Z-Z' direction as the vibratable plate 100 and the operation panel 400 vibrate.

On the Z' direction side of the touch sensor 300 there may be provided a display device, such as an organic light-emitting diode (OLED) display or a liquid crystal display (LCD). In this case, the vibratable plate 100 may have an opening (through hole), which is located on the Z'-direction side relative to the touch sensor 300 and allows the touch sensor 300 to directly face the display device. Such opening is unnecessary in the vibratable plate 100 in a case where no display device is provided. Where no display device is provided, the touch sensor 300 may be fixed directly on the first face 101 of the vibratable plate 100 to be positioned on the Z'-direction side relative to the operation face 411 of the operation panel 400. In this case, the touch sensor 300 vibrates in the Z-Z' direction as the vibratable plate 100 vibrates.

The touch sensor 300 includes a plurality of electrodes 310. As shown in FIG. 1, the electrodes 310 may be disposed at spaced intervals on the same plane in plan view as seen from the Z-direction side relative to the operation face 411 of the operation panel 400 (this view may be hereinafter referred to simply as "in plan view"). Alternatively, some of the electrodes 310 may be disposed at spaced intervals on a first plane, and the other electrodes 310 may be disposed at spaced intervals on a second plane at a different height in Z-Z' direction from the first plane, and the electrodes 310 on the first plane may intersect the electrodes 310 on the second plane in plan view. In either case, the touch sensor 300 may have the following configuration (A) or (B).

Configuration (A): When a detection object touches the operation face 411 and the detection object approaches at least one of the electrodes 310, there occurs a change in electrostatic capacitance between the approached electrode 310 and the detection object. In response to the change in electrostatic capacitance, there occurs a change in output signal (voltage or current) from the approached electrode 310.

Configuration (B) The electrodes 310 include at least one pair of adjacent or intersecting electrodes 310 in plan view. One of the adjacent or intersecting electrode pair 310 is a drive electrode (Tx electrode), and the other is a detection electrode (Rx electrode). The drive electrode and the detection electrode are electrostatically connected to each other. When a detection object touches the operation face 411 and approaches at least one pair of adjacent or intersecting electrodes 310 (drive and detection electrodes), there occurs a change in electrostatic capacitance between the approached drive and detection electrodes. In response to the change in electrostatic capacitance, there occurs a change in output signal (voltage or current) from the approached detection electrode.

The touch sensing device T1 further includes a housing 500 and a fixed plate 600. The housing 500 has an opening 510. The opening 510 has an inner size slightly larger than the outer size of the operation panel 400 in plan view. The operation panel 400 is accommodated in the opening 510. In other words, the operation panel 400 is exposed through the opening 510 to the outside of the housing 500.

The fixed plate 600 is a plate of metal or plastic material (e.g., polymethyl methacrylate (PMMA), polycarbonate (PC), polybutylene terephthalate (PBT), ABS resin, or the like material), for example. The fixed plate 600 is disposed on the Z'-direction side relative to the second face 102 of the vibratable plate 100 in spaced relation to the second face 102.

The touch sensing device T1 further includes an opposed part O1 (first opposed part), an opposed part O2 (second opposed part), a cushioning member 700a (first cushioning member), and a cushioning member 700b (second cushioning member). The opposed part O1 is a part of the housing 500 opposed to the vibratable plate 100 in the Z-Z' direction, particularly disposed on the Z-direction side relative to the vibratable plate 100. The opposed part O2 is a part of the fixed plate 600 opposed to the vibratable plate 100 in the Z-Z' direction particularly disposed on the Z'-direction side relative to the vibratable plate 100. In the embodiment of FIG. 1, the opposed part O1 is the periphery of the opening 510 of the housing 500, opposed to the vibratable plate 100 in the Z-Z' direction, while the opposed part O2 is a ring-shaped portion of the fixed plate 600, opposed to the vibratable plate 100 and positioned on the Z'-direction side relative to the leg 420 of the operation panel 400.

The cushioning members 700a and 700b hold the vibratable plate 100 in the Z-Z' direction. Each of the cushioning members 700a and 700b is a loop-shaped elastic body made of silicone rubber, urethane rubber, or other rubber, a foaming material, or the like material. The cushioning member 700a is interposed in the Z-Z' direction directly or indirectly between, and directly or indirectly in contact with, the vibratable plate 100 and the opposed part O1 of the housing 500 of any of the above aspects. The cushioning member 700b is interposed in the Z-Z' direction directly or indirectly between, and directly or indirectly in contact with, the vibratable plate 100 and the opposed part O2 of the fixed plate 600 of any of the above aspects. The cushioning members 700a and 700b are located on an inner side of the touch sensing device T1 relative to the at least one vibration generator 200 in the X-X' direction. The operation face 411 is located on an inner side of the touch sensing device T1 relative to the cushioning members 700a and 700b in the X-X' direction.

It is preferable but not required that each of the cushioning members 700a and 700b have a thickness of 1 mm to 10 mm in the Z-Z' direction, for example. The cushioning members 700a and 700b may have different thicknesses in the Z-Z' direction as shown in FIG. 1 or may have an identical thickness in the Z-Z' direction.

The cushioning member 700a may consist of a plurality of parts disposed between the vibratable plate 100 and the opposed part O1 of the housing 500 of any of the above aspects to be arranged in a loop shape at spaced intervals along the circumferential direction of the opposed part O1. The cushioning member 700b may consist of a plurality of parts disposed between the vibratable plate 100 and the opposed part O2 of the fixed plate 600 of any of the above aspects to be arranged in a loop shape at spaced intervals along the circumferential direction of the opposed part O2.

The cushioning members 700a and 700b of any of the above aspects reduce vibration in the Z-Z' direction of the vibratable plate 100. More specifically, the cushioning members 700a and 700b reduce vibration in the Z-Z' direction of the vibratable plate 100 to an extent that the amount of displacement in the Z-Z' direction of the vibratable plate 100 is smaller than the amount of movement in the Z-Z' direction of the or each plunger 210 of the at least one vibration generator 200. To serve this purpose, it is preferable but not required that the cushioning member 700a have a hardness of 20 to 40 on the Asker C hardness scale, for example, and the cushioning member 700b have a hardness of 20 to 40 on the Asker C hardness scale, for example.

When the operation face 411 of the operation panel 400 vibrates in the Z-Z' direction, the operation face 411 shakes and may be hard to see for a user. (It should be appreciated that where a display device is provided, the operation face 411 serves as the display face, and the shake of the display face may result in blurred images on the display face.) To reduce the shake (vibration in the Z-Z' direction) of the operation face 411 of the operation panel 400, the vibratable plate 100 preferably has an amount of displacement of about 0.1 mm to 0.5 mm. Meanwhile, for the purpose of transmitting a suitable vibration (operation feeling) to a detection object to touch the operation face 411 of the operation panel 400, it is preferable for the reasons below that the or each plunger 210 of the at least one vibration generator 200 have an amount of movement of 2 mm or larger (e.g., 2 mm to 5 mm) in the Z-Z' direction.

Where the vibration generator 200 is an electromagnetic solenoid, if the solenoid was provided with a plunger having an amount of movement of 0.5 mm or smaller, such plunger would immediately reach the maximum movement position when the coil of the electromagnetic solenoid is excited. This means that the plunger would reach the maximum movement position before reaching the intended current value of the coil for the electromagnetic solenoid, so that the plunger would not obtain a sufficient magnetic flux density, resulting in that the plunger would not to be attracted, or would be unlikely to be attracted, by the coil (resulting in insufficient attraction force by the coil).

This is in contrast with the touch sensing device T1, in which it is possible to adopt a plunger having an amount of movement of 2 mm or larger as the or each plunger 210 of the at least one vibration generator 200. This is because the cushioning members 700a and 700b reduce vibration in the Z-Z' direction of the vibratable plate 100 in a manner as described above and thereby bring the amount of displacement of the vibratable plate 100 into the range of about 0.1 mm to about 0.5 mm. It is therefore preferable that the or each plunger 210 of the at least one vibration generator 200 have an amount of movement of several millimeters in the Z-Z' direction.

The cushioning members 700a and 700b of any of the above aspects hold the vibratable plate 100 therebetween. The operation panel 400, the touch sensor 300, and the vibratable plate 100 are movable in the Z' direction relatively to the housing 500 and the fixed plate 600 from their neutral positions (see FIG. 1) when a user gives input to the touch sensing device T1 by touching the operation face 411 of the operation panel 400 with a detection object. When moved, the vibratable plate 100 is away from the housing 500 so as to expand the cushioning member 700a between the vibratable plate 100 and the opposed part O1 of the housing 500, and the vibratable plate 100 also approaches the fixed plate 600 so as to compress the cushioning member 700b between the vibratable plate 100 and the opposed part O2 of the fixed plate 600. When the operation face 411 of the operation panel 400 is released from the touch by the detection object, the cushioning members 700a and 700b restored to their original forms so as to bring the operation panel 400, the touch sensor 300, and the vibratable plate 100 their neutral positions.

It should be noted that the touch sensing device T1 only requires at least one opposed part O1 and at least one opposed part O2, and at least one cushioning member 700a and at least one cushioning member 700b.

The touch sensing device T1 may preferably further include at least one load detector 800 and a control part 900. The at least one load detector 800 is configured to detect that the operation panel 400 has been pressed, i.e. that the touch sensor 300 has been pressed indirectly via the operation panel 400, and then to output or change an output signal.

The at least one load detector 800 can be configured as follows, for example. The at least one load detector 800 is interposed in the Z-Z' direction between the vibratable plate 100 and the fixed plate 600. The or each load detector 800 includes a pressure-sensitive element 810 and a pin 820. The pressure-sensitive element 810 may be in contact with the vibratable plate 100 and the pin 820 in contact with the fixed plate 600 (see FIG. 1), or vice versa. In either case, when the operation face 411 is touched and the vibratable plate 100 accordingly moves in the Z' direction, the pressure-sensitive element 810 and the pin 820 are compressed between the vibratable plate 100 and the fixed plate 600, so that the pin 820 applies pressure to the pressure-sensitive element 810, i.e. applies load onto the operation panel 400. The pressure-sensitive element 810 is configured to output or change an output signal in accordance with the above pressure. The at least one load detector 800 may be interposed in the Z-Z' direction between the vibratable plate 100 and a member other than the fixed plate 600.

The control part 900 is constituted by logic circuits, such as an IC, or software to be processed by a processor, or the like. The control part 900 includes a touch control part and a tactile-feel control part. The control part 900 is electrically connected to the touch sensor 300, the at least one vibration generator 200, and the load detector 800, for example as shown in broken lines in. FIG. 1.

Where the touch sensor 300 has Configuration (A) as described above, the touch control part of the control part 900 is configured as follows. The touch control part sequentially receives and amplifies signals from the electrodes 310 of the touch sensor 300, and determines whether each amplified signal exceeds a threshold value stored in a memory of the control part 900. When determining that the amplified signal exceeds the threshold value, the touch control part detects a coordinate position at which the detection object has approached the electrode 310 having outputted the signal exceeding the threshold value (i.e. the Z-direction side of the electrode 310 is the coordinate position in the operation face 411 touched by the detection object). This configuration of the touch control part may be modified such that the touch control part detects the touched coordinate position in the operation face 411 on the basis of more than one of that electrodes 310 that each have outputted a signal exceeding the threshold value.

Where the touch sensor 300 has Configuration (B) as described above, the touch control part of the control part 900 is configured as follows. The touch control part sequentially supplies drive pulses to the drive electrodes, sequentially receives and amplifies signals that are outputted from the detecting electrodes (electrodes 310) in accordance with the drive pulses, and determines whether each amplified signal exceeds a threshold value stored in a memory of the control part 900. When determining that the amplified signal exceeds the threshold value, the touch control part detects that the detection object has approached the intersection of the drive electrode having supplied such drive pulse and the detection electrode having outputted such signal (i.e. detects that the Z-direction side of the intersection is the coordinate position in the operation face 411 touched by the detection object).

The tactile-feel control part of the control part 900 may have any of the following configurations (a) to (c).

Configuration (a): The tactile-feel control part of the control part 900 is configured as follows. In response to an input of an output signal from the load detector 800, or in response to a change in the output signal (e.g., when an output signal from the load detector 800 exceeds a threshold value, which is different from the threshold value for the touch control part and stored in a memory of the control part 900), the tactile-feel control part turns on (drives) the at least one vibration generator 200 for a first predetermined period (e.g., ten milliseconds) to cause the vibratable plate 100 to vibrate so as to transmit the vibration to the operation face 411 of the operation panel 400. The tactile control part measures the first predetermined period using an internal timer circuit and turns off the at least one vibration generator 200 upon a lapse of the first predetermined period.

In this configuration, when a detection object touches the operation face 411 of the operation panel 400 to apply a load to the operation face 411, the operation panel 400 vibrates.

The vibration is transmitted, via the operation face 411 of the operation panel 400, to the detection object that has touched the operation face 411.

Configuration (b): The tactile-feel control part of the control part 900 is configured as follows. The tactile-feel control part determines, on the basis of input of an output signal from the load detector 800, or on the basis of a change in an output signal from the load detector 800, whether the output signal from the load detector 800 exceeds a first threshold value, which corresponds to a first load and is stored in a memory of the control part 900 (determines whether a load applied to the operation face 411 of the operation panel 400 is equal to or larger than the first load). When determining that the output signal from the load detector 800 exceeds the first threshold value (when determining that the applied load is equal to or larger than the first load), the tactile-feel control part turns on (drives) the at least one vibration generator 200 for a first predetermined period (e.g., ten milliseconds) to cause the vibratable plate 100 to vibrate so as to transmit the vibration to the operation face 411 of the operation panel 400, and the tactile-feel control part determines, on the basis of input of an output signal from the load detector 800, or on the basis of a change in an output signal from the load detector 800, whether the output signal from the load detector 800 becomes equal to or less than a second threshold value, which corresponds to a second load smaller than the first load and is stored in the memory of the control part 900 (determines whether a load applied to the operation face 411 of the operation panel 400 becomes equal to or less than the second load) within a second predetermined period (e.g., one second). When determining that the output signal from the load detector 800 becomes equal to or less than the second threshold value (becomes equal to or less than the second load), the tactile-feel control part turns on (drives) the at least one vibration generator 200 for the first predetermined period (e.g., ten milliseconds) to cause the vibratable plate 100 to vibrate so as to transmit the vibration to the operation face 411 of the operation panel 400. The tactile control part of the control part 900 measures each first predetermined period using an internal timer circuit and turns off the at least one vibration generator 200 upon a lapse of each first predetermined period. The tactile control part starts to measure the second predetermined period using an internal timer circuit upon determining that the output signal from the load detector 800 exceeds the first threshold value, and turns off the at least one vibration generator 200 upon a lapse of the second predetermined period.

In this configuration, when a detection object touches the operation face 411 of the operation panel 400 to apply a load (a load equal to or larger than the first load) to the operation face 411, the operation panel 400 vibrates. The vibration is transmitted, via the operation face 411 of the operation panel 400, to the detection object that has touched the operation face 411. After that, when the detection object moves away from the operation face 411 of the operation panel 400 so that the load applied to the operation face 411 of the operation panel 400 becomes equal to or less than the second load, the operation panel 400 vibrates. The vibration is transmitted, via the operation face 411 of the operation panel 400, to the detection object moving away from the operation face 411.

Configuration (c): The tactile-feel control part of the control part 900 is configured as follows. In response to a change in signals outputted from the electrodes 310 of the touch sensor 300 (e.g., when one of the electrode 310 outputs a signal exceeding a threshold value), the tactile-feel control part turns on the at least one vibration generator 200 for a first predetermined time to cause the vibratable plate 100 to vibrate so as to transmit the vibration to the operation face 411 of the operation panel 400. The tactile control part of the control part 900 measures each first predetermined period using an internal timer circuit and turns off the at least one vibration generator 200 upon a lapse of each first predetermined period.

In this configuration, when the touch sensor 300 detects that a detection object has touched the operation face 411 of the operation panel 400, the operation panel 400 vibrates. The vibration is transmitted, via the operation face 411 of the operation panel 400, to the detection object that has touched the operation face 411. The tactile-feel control part of configuration (c) do not need the load detector 800.

Each of the touch control part and the tactile-feel control part of the control part 900 may be constituted by logic circuits, such as an IC, or software to be processed by a processor, or the like. The tactile-feel control part of the control part 900 may be omitted. Alternatively, the control part 900 may be omitted and replaced with a control part of an electronic apparatus, or the like that operates with the touch sensing device T1.

The touch sensing device T1 configured as described above provides the following technical features and effects.

First technical features and effects: The or each plunger 210 of the at least one vibration generator 200 has sufficient amount of movement in the Z-Z' direction, while reducing vibration of the operation face 411 of the operation panel 400. This is because the cushioning member 700a and/or the cushioning member 700b serve to reduce the amount of displacement in the Z-Z' direction of the vibratable plate 100 to an amount smaller than the amount of movement in the Z-Z' direction of the or each plunger 210 of the at least one vibration generator 200. As a result, it is possible to suppress the vibration of the operation face 411 of the operation panel 400 configured to vibrate together with the vibratable plate 100.

Second technical features and effects: The touch sensing device T1 has a downsizes touch sensor 300 for the following reason. The touch sensor 300 is fixed directly or indirectly to the vibratable plate 100, the vibration generator 200 is configured to transmit vibration to the vibratable plate 100, the cushioning member 700a is interposed in the Z-Z' direction between the vibratable plate 100 and the opposed part O1, and the cushioning member 700b is interposed in the Z-Z' direction between the vibratable plate 100 and the opposed part O2. As a result, the touch sensor 300 does not need a region for fixing the cushioning members 700a and 700b, or a region for contact with the vibration generator 200.

Third technical features and effects: The touch sensing device T1 is downsized for the following reason. The at least one load detector 800 is interposed between the vibratable plate 100 and the fixed plate 600. In other words, the space between the vibratable plate 100 and the fixed plate 600 is effectively used as the accommodation space for the at least one load detector 800. Further, the touch sensing device T1 has a reduced number of components. This is because the vibratable plate 100 and the fixed plate 600, which are provided for holding the cushioning member 700b, are utilized to hold the at least one load detector 800.

Second Embodiment

Figure 2:
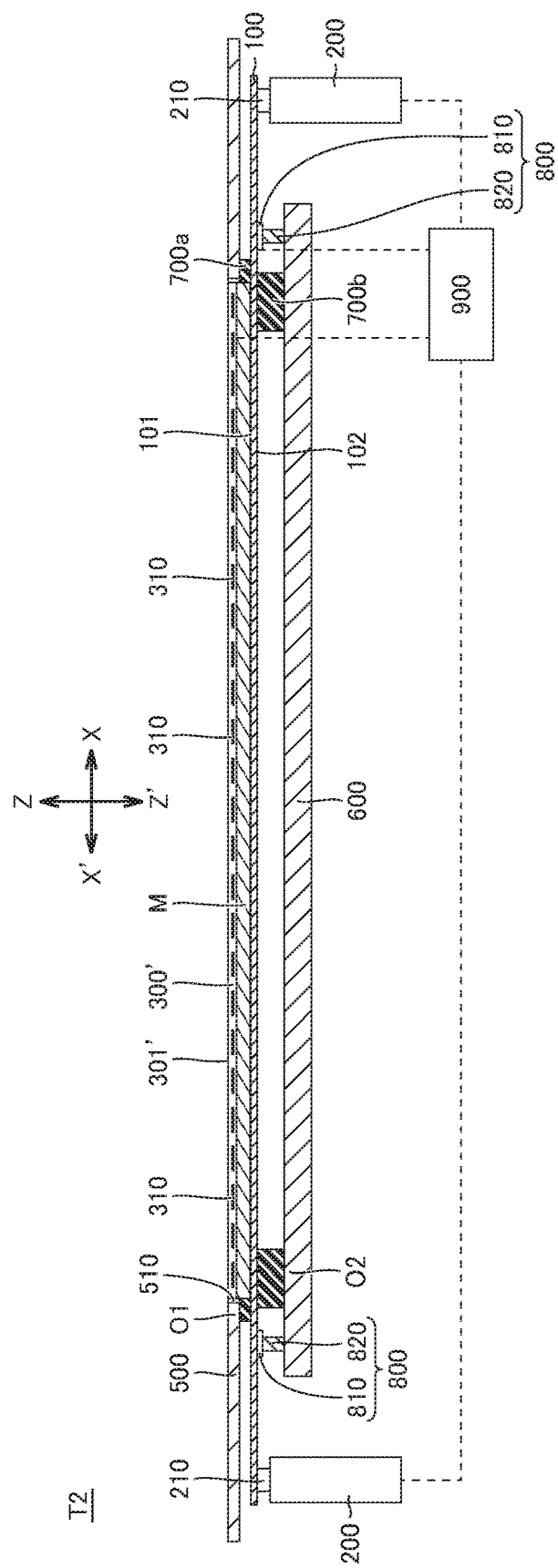
FIG. 2 is a schematic sectional view of a touch sensing device according to a second embodiment of the invention.

The following describes a touch sensing device T2 according to a plurality of embodiments including a second embodiment of the invention, with reference to FIG. 2. The touch sensing device T2 has a similar configuration to that of the touch sensing device T1 but differ from the touch sensing device T1 in that the operation panel 400 is omitted. This difference will be described in detail, and overlapping descriptions will be omitted. In FIG. 2, the broken lines indicate the electrical connections between the control part 900, a touch sensor 300', the at least one vibration generator 200, and the load detector 800.

The touch sensor 300' has a similar configuration to that of the touch sensor 300 of the touch sensing device T1 of any one of the above aspects. The touch sensor 300' is different from the touch sensor 300 in that the touch sensor 300' further includes an operation face 301 and is fixed to a first face 101 of a vibratable plate 100 indirectly, via an intermediate material M interposed therebetween (see FIG. 2) or with a double-sided adhesive material (not shown). In plan view, the touch sensor 300' has an outer size smaller than an inner size of an opening 510 of a housing 500. The touch sensor 300' is accommodated in the opening 510 of the housing 500. In other words, the touch sensor 300' is exposed the opening 510 to the outside of the housing 500

The operation face 301 of the touch sensor 300', an outer face of the touch sensor 300' on the Z-direction side, is to be touched by a user with a detection object for giving input to the touch sensing device T2. The touch sensor 300' vibrates as the vibratable plate 100 vibrates and transmits the vibration via the operation face 301 to the detection object, in a similar manner described for the touch sensing device T1 of any of the above aspects.

The touch sensing device T2 as described above provides the following technical features and effects. First, the or each plunger 210 of the at least one vibration generator 200 has sufficient amount of movement in the Z-Z' direction, while reducing vibration of the operation face 301 of the touch sensor 300'. This is because the cushioning member 700a and/or the cushioning member 700b serve to reduce the amount of displacement in the Z-Z' direction of the vibratable plate 100 to an amount smaller than the amount of movement in the Z-Z' direction of the or each plunger 210 of the at least one vibration generator 200. As a result, it is possible to suppress the vibration of the operation face 301 of the touch sensor 300' configured to vibrate together with the vibratable plate 100. Second, the touch sensing device T2 further provide technical features and effects similar to the second and third technical features and effects of the touch sensing device T1.

Third Embodiment

Figure 3:
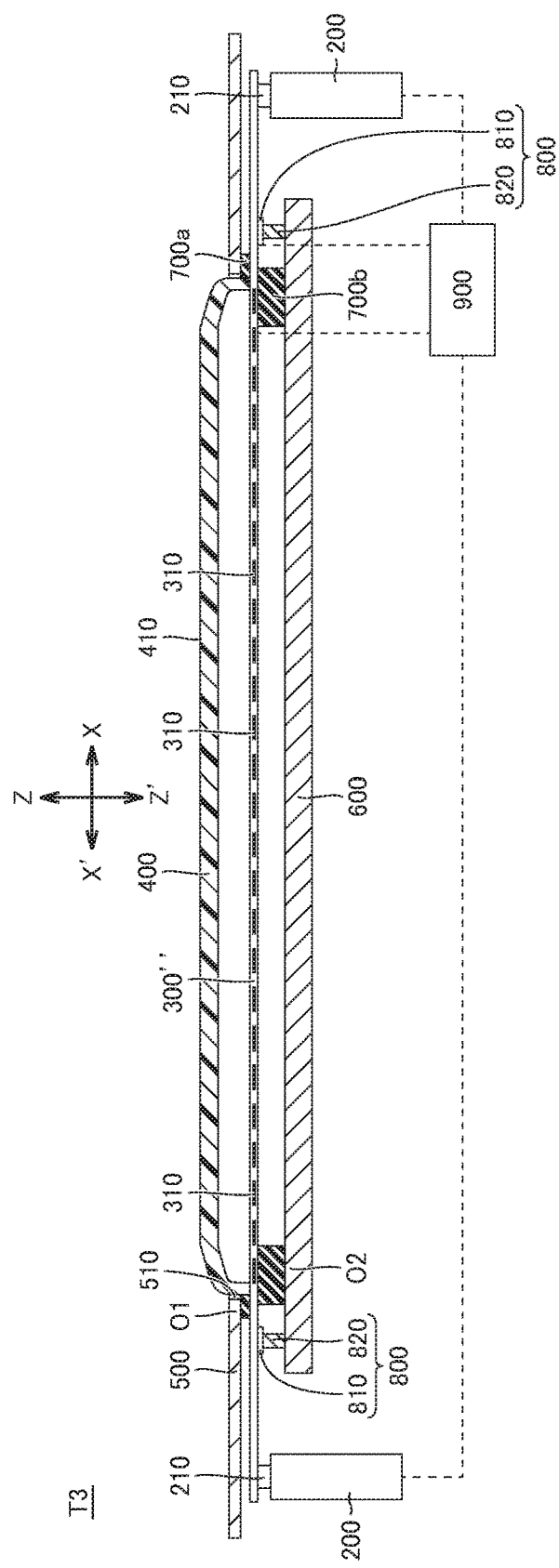
FIG. 3 is a schematic sectional view of a touch sensing device according to a third embodiment of the invention.

The following describes a touch sensing device T3 according to a plurality of embodiments including a third embodiment of the invention, with reference to FIG. 3. The touch sensing device T3 has a similar configuration to that of the touch sensing device T1 but differ from the touch sensing device T1 in the following points: (1) the vibratable plate 100 is omitted; (2) the cushioning members 700a and 700b, in place of the vibratable plate 100, hold a touch sensor 300" in the Z-Z' direction; and (3) the at least one vibration generator 200 transmits vibration to the touch sensor 300". These differences will be described in detail, and overlapping descriptions will be omitted. In FIG. 3, the broken lines indicate the electrical connections between the control part 900, the touch sensor 300", the at least one vibration generator 200, and the load detector 800.

The touch sensor 300" has a similar configuration to that of the touch sensor 300 of the touch sensing device T1, but different in that it is held in the Z-Z' direction by the cushioning members 700a and 700b.

The cushioning member 700a is interposed in the Z-Z' direction between the touch sensor 300" and the opposed part O1 of the housing 500 of any one of the above aspects. The cushioning member 700b is interposed in the Z-Z' direction between the touch sensor 300" and the opposed part O2 of the fixed plate 600 of any one of the above aspects.

An operation panel 400 of the touch sensing device T3 has a similar configuration to that of the operation panel 400 of the touch sensing device T1, but different in that the operation panel 400 of the touch sensing device T3 is fixed, not to the vibratable plate 100, but to a face on the Z-direction side of the touch sensor 300" with a double-sided adhesive material or the like.

The at least one vibration generator 200 may be disposed on the Z'-direction side as shown in FIG. 3, or on the Z-direction side, relative to the touch sensor 300". The plunger 210 is configured to reciprocate in the Z-Z' direction as the coil is excited, and to repeatedly press the touch sensor 300" in the Z-Z' direction so as to vibrate the touch sensor 300" in the Z-Z' direction. The touch sensor 300" is configured to, when vibrating in the Z-Z' direction, be repeatedly displaced in the Z-Z' direction.

As used herein an "amount of displacement" in the Z-Z' direction of the touch sensor 300" arising from the vibration means a distance in the Z-Z' direction from the position where the touch sensor 300" is displaced furthest in the Z direction to the position where the touch sensor 300" is displaced furthest in the Z' direction.

The tactile-feel control part of the control part 900 of the touch sensing device T3 may have a similar configuration to configuration (a) as described above but may differ in the following points. In response to an input of an output signal from the load detector 800, or in response to a change in an output signal from the load detector 800 (e.g., when an output signal from the load detector 800 exceeds a threshold value, which is different from the threshold value for the touch control part and stored in a memory of the control part 900), the tactile-feel control part of the touch sensing device T3 turns on (drives) the at least one vibration generator 200 for a predetermined period to cause the touch sensor 300" to vibrate.

The tactile-feel control part of the control part 900 of the touch sensing device T3 may have a similar configuration to configuration (b) as described above but may differ in the following points. When the tactile-feel control part of the touch sensing device T3 determines that the output signal from the load detector 800 exceeds the first threshold value (when determining that the applied load is equal to or larger than the first load), the tactile-feel control part turns on (drives) the at least one vibration generator 200 for the predetermined period (e.g., ten milliseconds) to cause the touch sensor 300" to vibrate. When determining that the output signal from the load detector 800 becomes equal to or less than the second threshold value (when determining that that an applied load becomes equal to or less than the second load), the tactile-feel control part turns on (drives) the at least one vibration generator 200 for a predetermined period to cause the touch sensor 300" to vibrate.

The tactile-feel control part of the control part 900 of the touch sensing device T3 may have a similar configuration to configuration (c) as described above but may differ in the following points. In response to a change in signals outputted from the electrodes 310 of the touch sensor 300 (e.g., when one of the electrode 310 outputs a signal exceeding the threshold value), the tactile-feel control part of the touch sensing device T3 turns on the at least one vibration generator 200 for the predetermined time to cause the touch sensor 300" to vibrate so as to transmit the vibration to the operation face 411 of the operation panel 400.

The touch sensing device T3 as described above provides the following technical features and effects. First, the or each plunger 210 of the at least one vibration generator 200 has sufficient amount of movement in the Z-Z' direction, while reducing vibration of the operation face 411 of the operation panel 400. This is because the cushioning member 700a and/or the cushioning member 700b serve to reduce the amount of displacement in the Z-Z' direction of the touch sensor 300" to an amount smaller than the amount of movement in the Z-Z' direction of the or each plunger 210 of the at least one vibration generator 200. As a result, it is possible to suppress the vibration of the operation face 411 of the operation panel 400 configured to vibrate together with the touch sensor 300". Second, the touch sensing device T3 further provide technical features and effects similar to the third technical features and effects of the touch sensing device T1.

The operation panel 400 may be omitted also in the touch sensing device T3. In this case, a face of the touch sensor 300" on the Z-direction side may serve as the operation face, as with the touch sensing device T2. Even in this variant, the cushioning member 700a and/or the cushioning member 700b serve to reduce the amount of displacement in the Z-Z' direction of the touch sensor 300" to an amount smaller than the amount of movement in the Z-Z' direction of the or each plunger 210 of the at least one vibration generator 200. As a result, it is possible to suppress the vibration of the operation face of the touch sensor 300".

The touch sensing devices described above are not limited to the above embodiments but may be modified in any manner within the scope of the claims. Some modification examples will be described below.

The invention only requires at least one opposed part, which may be any part opposed to the vibratable plate in the Z-Z' direction. The invention only requires at least one cushioning member, which may be any member interposed in the Z-Z' direction between the opposed part of any of the above aspects and the vibratable plate or the touch sensor of any of the above aspects and configured to reduce vibration in the Z-Z' direction of the vibratable plate.

The at least one vibration generator of the invention may have any plunger to transmit vibration in the Z-Z' direction to the vibratable plate or the touch sensor. For example, the or each vibration generator of the invention may be a vibration motor with a motor part and a plunger. The plunger may be configured to reciprocate in the Z-Z' direction by driving the motor part and repeatedly press the vibratable plate or the touch sensor of any of the above aspects in the Z-Z' direction to transmit vibration in the Z-Z' direction to the vibratable plate or the touch sensor. Alternatively, the or each vibration generator of the invention may be a vibration element including a shape memory alloy wire. In this case, the wire serves as a plunger to vibrate in the Z-Z' direction (i.e. reciprocate in the Z-Z' direction) and repeatedly press the vibratable plate or the touch sensor of any of the above aspects in the Z-Z' direction to transmit vibration in the Z-Z' direction to the vibratable plate or the touch sensor.

The control part of the invention may be configured to simply detect a touch on the operation face, rather than detecting a coordinate position of the touch on the operation face in response to a change in a signal outputted from the touch sensor.

It should be appreciated that the above embodiments and variants of the touch sensing devices are described above by way of examples only. The materials, shapes, dimensions, numbers, arrangements, and other configurations of the constituents of the touch sensing devices may be modified in any manner if they can perform similar functions. The configurations of the embodiments and the variants described above may be combined in any possible manner. The first direction of the invention may be any direction in which the vibratable plate of the touch sensing device of the invention vibrates. The second direction of the invention may be any direction that is substantially orthogonal to the first direction.

The invention is applicable any electronic apparatus that transmits a tactile feeling (vibration) via its operation face to other member. For example, electronic apparatus may adopt the configuration of the touch sensing device without the touch sensor.

The present invention can include any combination of these various features or embodiments above and/or below as set-forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

T1, T2, T3: Touch sensing device
100: Vibratable plate
101: First face
102: Second face
200: Vibration generator
210: Plunger
300, 300', 300": Touch sensor
301: Operation face
310: Electrode
400: Operation panel
410: Panel body
411: Operation face
420: Leg
500: Housing
510: Opening
600: Fixed plate
700a: Cushioning member (first cushioning member)
700b: Cushioning member (second cushioning member)
800: Load detector
810: Pressure-sensitive element
820: Pin
900: Control part
O1: Opposed part (first opposed part)
O2: Opposed part (second opposed part)

What is claimed is:

1. A touch sensing device comprising:
a vibratable plate;
a touch sensor;
a vibration generator including a plunger, the plunger being configured to reciprocate in a first direction so as to vibrate the vibratable plate in the first direction;
an operation face to be touched by a detection object for inputting to operate the touch sensing device, the operation face being vibratable in the first direction as a result of vibration of the vibratable plate;

an opposed part in opposing relation to the vibratable plate in the first direction;

a cushioning member interposed between the opposed part and the vibratable plate in the first direction, the cushioning member being configured to reduce an amount of displacement in the first direction of the vibratable plate arising from the vibration in the first direction such that the amount is smaller than an amount of movement in the first direction of the plunger;

a load detector to detect a load applied to the operation face when the operation face is touched by a detection object for inputting, and to output or change an output signal; and a control part to drive the vibration generator in response to an input of the output signal form the load detector, or in response to a change in the output signal from the load detector, wherein the control part is configured:

(1) to determine whether the load applied to the operation face is equal to or larger than a first load on the basis of the input of the output signal from the load detector, or on the basis of the change in the output signal form the load detector;

(2) when determining that the load is equal to or larger than the first load, to drive the vibration generator and determine whether the load applied to the operation face is equal to or less than a second load on the basis of the input of the output signal from the load detector, or the change in the output signal from the load detector, within a predetermined period, wherein the second load is smaller than the first load; and (3) when determining that the load is equal to or less than the second load, to drive the vibration generator.

2. The touch sensing device according to claim 1, wherein the opposed part comprises a plurality of opposed parts including a first and a second opposed part, the first opposed part being disposed on one side of the first direction relative to the vibratable plate, the second opposed part being disposed on the other side of the first direction relative to the vibratable plate, and the cushioning member comprises a plurality of cushioning members including a first and a second cushioning member, the first cushioning member being interposed between the first opposed part and the vibratable plate, the second cushioning member being interposed between the second opposed part and the vibratable plate.

3. The touch sensing device according to claim 1, further comprising an operation panel including the operation face, wherein the operation panel is disposed on the one side of the first direction relative to, and fixed to, the vibratable plate, and the touch sensor is fixed to, or disposed inside, the operation panel.

4. The touch sensing device according to claim 1, wherein the vibratable plate has a first face on one side of the first direction and a second face on the other side of the first direction, and the touch sensor is fixed to the first face of the vibratable plate.

5. The touch sensing device according to claim 1, further comprising a control part to drive the vibration generator in response to a change in an output signal from the touch sensor.

6. The touch sensing device according to claim 1, further comprising:

a load detector to detect a load applied to the operation face when the operation face is touched by a detection object for inputting, and to output or change an output signal;

a control part to drive the vibration generator in response to an input of the output signal or in response to a change in the output signal from the load detector; and a fixed plate including the opposed part, wherein the load detector is interposed between the fixed plate and the vibratable plate in the first direction.

7. The touch sensing device according to claim 1, wherein the cushioning member is located on an inner side of the touch sensing device relative to the vibration generator in a second direction substantially orthogonal to the first direction, and the operation face is located on an inner side of the touch sensing device relative to the cushioning member in the second direction.

8. A touch sensing device comprising:

a touch sensor;

a vibration generator including a plunger, the plunger being configured to reciprocate in a first direction so as to vibrate the touch sensor in the first direction;

an operation face to be touched by a detection object for inputting to operate the touch sensing device, the operation face being vibratable in the first direction as a result of vibration of the touch sensor;

an opposed part in opposing relation to the touch sensor in the first direction;

a cushioning member interposed between the opposed part and the touch sensor in the first direction, the cushioning member being configured to reduce an amount of displacement in the first direction of the touch sensor arising from the vibration in the first direction such that the amount is smaller than an amount of movement in the first direction of the plunger;

a load detector to detect a load applied to the operation face when the operation face is touched by a detection object for inputting, and to output or change an output signal; and a control part to drive the vibration generator in response to an input of the output signal form the load detector, or in response to a change in the output signal from the load detector, wherein the control part is configured:

(1) to determine whether the load applied to the operation face is equal to or larger than a first load on the basis of the input of the output signal from the load detector, or on the basis of the change in the output signal form the load detector;

(2) when determining that the load is equal to or larger than the first load, to drive the vibration generator and determine whether the load applied to the operation face is equal to or less than a second load on the basis of the input of the output signal from the load detector, or the change in the output signal from the load detector, within a predetermined period, wherein the second load is smaller than the first load; and (3) when determining that the load is equal to or less than the second load, to drive the vibration generator.

9. The touch sensing device according to claim 8, wherein
the opposed part comprises a plurality of opposed parts including a first and a second opposed part, the first opposed part being disposed on one side of the first direction relative to the touch sensor, the second opposed part being disposed on the other side of the first direction relative to the touch sensor, and the cushioning member comprises a plurality of cushioning members including a first and a second cushioning member, the first cushioning member being interposed between the first opposed part and the touch sensor, the second cushioning member being interposed between the second opposed part and the touch sensor.

10. The touch sensing device according to claim 8, further comprising an operation panel including the operation face, the operation panel being disposed on the one side of the first direction relative to, and fixed to, the touch sensor.

11. The touch sensing device according to claim 8, further comprising a control part to drive the vibration generator in response to a change in an output signal from the touch sensor.

12. The touch sensing device according to claim 8, further comprising:
a load detector to detect a load applied to the operation face when the operation face is touched by a detection object for inputting, and to output or change an output signal;
a control part to drive the vibration generator in response to an input of the output signal or in response to a change in the output signal from the load detector; and
a fixed plate including the opposed part,
wherein the load detector is interposed between the fixed plate and the vibratable plate in the first direction.

13. The touch sensing device according to claim 8, further comprising:
a load detector to detect a load applied to the operation face when the operation face is touched by a detection object for inputting, and to output or change an output signal;
a control part to drive the vibration generator in response to input of the output signal or change in the output signal from the load detector; and
a fixed plate including the opposed part,
wherein the load detector is interposed between the fixed plate and the touch sensor in the first direction.

14. The touch sensing device according to claim 8, wherein
the cushioning member is located on an inner side of the touch sensing device relative to the vibration generator in a second direction substantially orthogonal to the first direction, and
the operation face is located on an inner side of the touch sensing device relative to the cushioning member in the second direction.

* * * * *